Nov. 22, 1955   S. VORECH   2,724,410
FLUID PRESSURE DIAPHRAGM SECURING ASSEMBLY
Filed Dec. 29, 1950   2 Sheets-Sheet 2
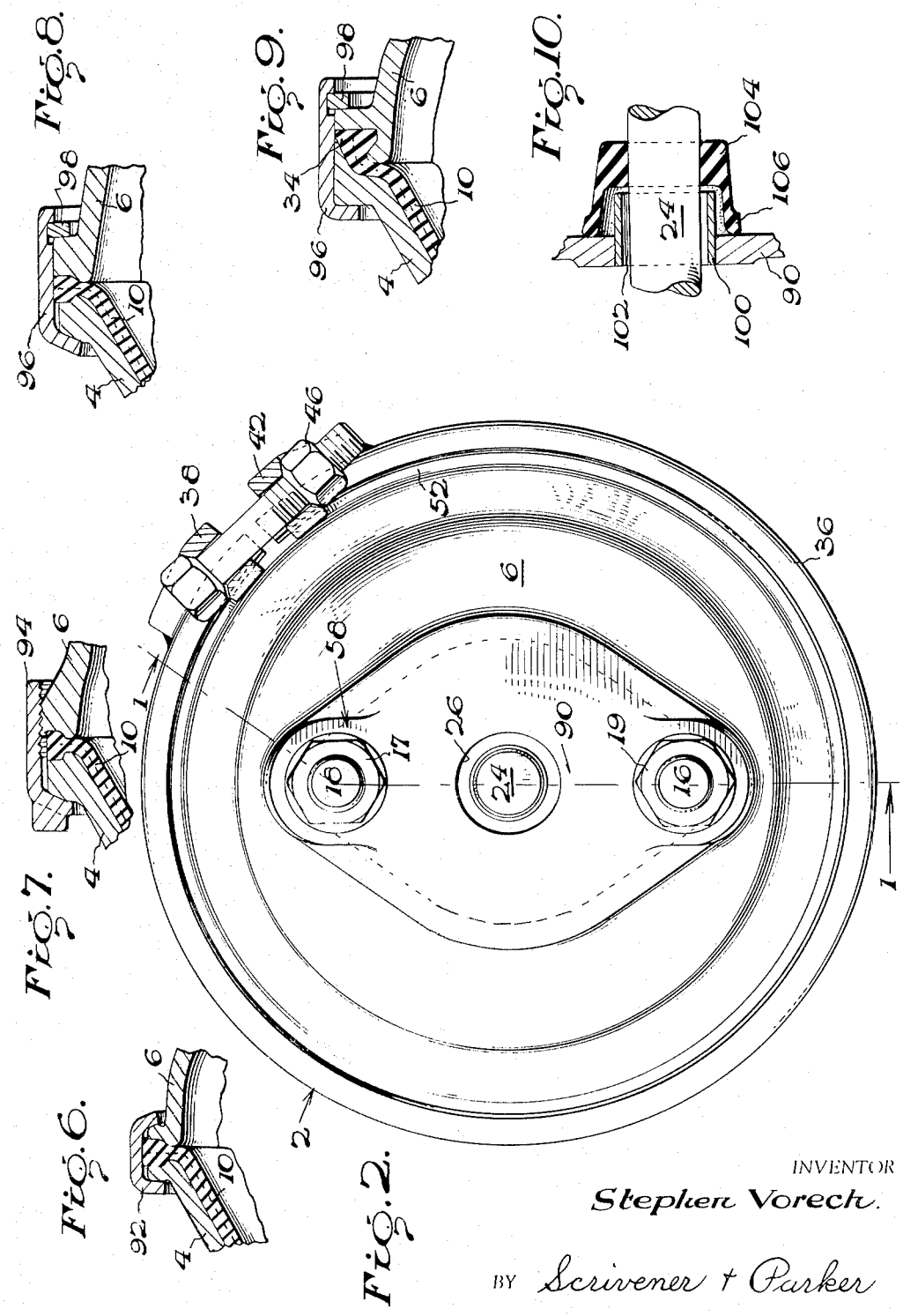
INVENTOR
Stephen Vorech.
BY Scrivener + Parker
ATTORNEYS

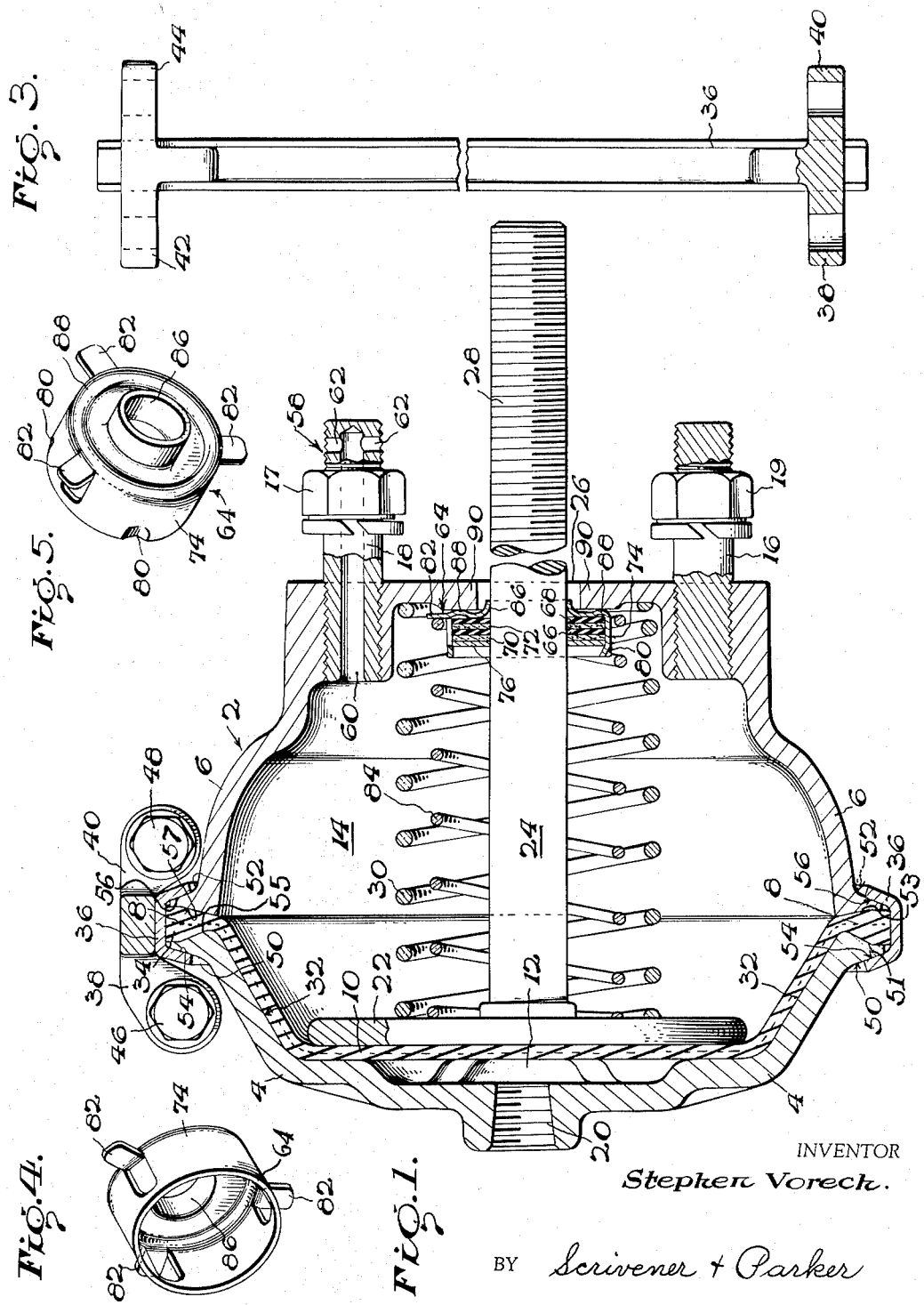

United States Patent Office 2,724,410
Patented Nov. 22, 1955

2,724,410

FLUID PRESSURE DIAPHRAGM SECURING ASSEMBLY

Stephen Vorech, Elyria, Ohio, assignor to Bendix-Westinghouse Automotive Air Brake Company, Elyria, Ohio, a corporation of Delaware Application December 29, 1950, Serial No. 203,359

4 Claims. (Cl. 137—791)

This invention relates to fluid pressure actuated devices and more particularly to an actuator which may be well adapted for the actuation of automotive vehicle brakes equipped with a compressed air operated braking system.

One of the objects of the present invention is to provide a fluid pressure actuator of relatively small diameter which is highly effective in operation and which may be readily incorporated in vehicle air brake installations to occupy a minimum of space.

A further object is to provide in a fluid pressure actuator of the type having a pair of dished plates for providing a chamber and for clamping an actuating diaphragm therebetween, a novel construction for securing such plates and diaphragm together which avoids the use of holes in the periphery of the diaphragm for reception of the customary clamping screws.

Another object of the invention resides in the use of a novel clamping band or strap which may be quickly assembled with the dished plates and diaphragm to securely hold these parts in position.

Still another object is to provide in a fluid pressure actuator of the foregoing character, a novel arrangement for sealing the actuator against the entrance of dust, dirt and water, which might otherwise seriously impair the efficiency of the actuator, especially when in use in connection with vehicle braking installations.

A still further object is to provide a leakproof actuator of small size and one which is so constructed as to have a substantially uniform output throughout its effective working ranges.

Other objects and novel features of the invention will appear more fully hereinafter from the following detailed description when taken in connection with the accompanying drawings. It is to be expressly understood, however, that the drawings are utilized for purposes of illustration only and are not designed as a definition of the limits of the invention, reference being had for this purpose, to the appended claims.

In the drawings wherein similar reference characters refer to similar parts throughout the several views:

Fig. 1 is an axial sectional view of a fluid pressure actuator constructed in accordance with the principles of the present invention;

Fig. 2 is an end view of the actuator and illustrates a portion of the clamping strap or band in section;

Fig. 3 is plan view of the clamping strap;

Fig. 4 is a perspective view of the shell for housing the elements of the push rod seal;

Fig. 5 is another perspective view of the shell of Fig. 4;

Figs. 6, 7, 8 and 9 are partial views in section of modified forms of clamping devices for the dished plates and diaphragm, and Fig. 10 is a partial view in section of a modified form of breather or vent for the actuator.

Referring more particularly to Figs. 1 and 2, the novel fluid pressure actuator 2 of the present invention is illustrated therein as being formed from a pressure plate 4 and a non-pressure plate 6, these plates being dished, as shown, and being clamped together and to the peripheral portion 8 of a flexible diaphragm 10, of reinforced rubber composition, the construction being such that a pressure chamber 12 and an atmospheric chamber 14 are formed on opposite sides of the diaphragm 10. A pair of studs 16 and 18 together with nuts 17 and 19 are provided for mounting the actuator 2 on a convenient mounting bracket (not shown) and a port 20 is formed in the pressure plate 4 for admitting compressed air or other fluid pressure to the pressure chamber 12 in order to move the diaphragm 10 to the right, as viewed in Fig. 1. Such movement of the diaphragm 10 causes a corresponding movement of a plate 22 having a push rod 24 rigidly connected therewith, the latter extending outwardly through an enlarged opening 26, in the plate 6, and having its outer end threaded at 28 in order to adapt the push rod 24 for connection with the part to be actuated, such as a slack adjuster in compressed air brake installations for automotive vehicles. A spring 30 is confined between the end wall of the plate 6 and the plate 22 to normally maintain the latter in engagement at all times, with the diaphragm 10, and to return the latter to the position illustrated when fluid pressure is exhausted from the pressure chamber 12, while the enlarged opening 26 allows a limited amount of lateral movement of the push rod 24 during operation of the actuator.

One of the features of the present invention resides in the formation of the pressure plate 4 so that its surface 32, against which the diaphragm 10 lies when the actuator 2 is inoperative, is positioned at a relatively slight angle with respect to a horizontal plane. Due to this construction, as the diaphragm 10 is moved to the right, during its working stroke, the effective area thereof subjected to the pressure fluid will not materially increase, and the actuator output will be substantially uniform throughout its effective working range. In addition, this construction contributes to the reduction in diameter of the unit.

Novel means are provided for securing the plates 4 and 6 and the diaphragm 10 together, and in the form shown in Figs. 1, 2 and 3, such means enables the aforementioned parts to be quickly and effectively assembled. More particularly, the peripheral or marginal portion 8 of the diaphragm 10 is provided with an enlarged peripheral bead 34 so that when the plates 4 and 6 are assembled, the diaphragm will be securely held at its marginal edge. The novel securing means, in the form shown in Figs. 1, 2 and 3 is constituted by a channel-shaped strap or band 36 which is adapted to encircle the plates 4 and 6. Opposite ends of the strap 36 are respectively provided with lateral extensions or lugs 38, 40 and 42, 44 which are suitably apertured for reception of bolts and nuts 46 and 48 in order that the strap 36 may be tightened. When the opposite ends of the strap 36 are brought toward each other, through tightening of the bolts and nuts 46 and 48, the channel-shaped strap 36 will move the plates 4 and 6 toward each other with an appreciable force in order to secure these parts firmly together with the diaphragm bead 34 interposed therebetween. This squeezing or clamping action is achieved by coaction between the tapered walls 50 and 52 of the respective plates 4 and 6, and the tapered walls 54 and 56 of the strap 36. More particularly, the walls 50 and 52 constitute a pair of annular or circumferential shoulders which converge outwardly and cooperate with the tapered walls 54 and 56 of the strap 36, the latter walls forming spaced-apart, annular shoulders which diverge inwardly with respect to each other. As will be readily seen from Fig. 1, the portion 8 of the diaphragm 10 is progressively thickened in a radially outward direction to provide the enlarged bead 34, which is consequently wedge-shaped in cross-section to provide opposite circumferential surfaces 51 and 53 which diverge outwardly with respect to each other. It will also be seen that the housing plates 4 and 6 are provided with tapered walls 55 and 57 which also diverge outwardly with respect to each other and that the surfaces 51 and 53 of the diaphragm bead 34 are respectively complementary to the tapered walls 55 and 57. Due to this construction, the walls 55 and 57 have a substantially flat surface engagement with the surfaces 51 and 53 over a substantially large area. Hence, with the wedge-shaped bead 34 and the construction provided, there is obtained a maximum amount of rubber in direct shear as well as a maximum amount of bead surface contact with the clamping surfaces 55 and 57, to effectively resist the pulling out of the bead. The use of the strap 36 securely clamps the above parts together and avoids the necessity of drilling bolt holes in the peripheral portions of the plates 4 and 6 and the diaphragm 10 in order that these parts may be assembled with bolts. Hence, the construction of the invention further contributes to the reduction in the diameter of the acuator as well as providing an arrangement enabling the parts to be quickly assembled.

In order to vent the chamber 14 to the atmosphere, a novel breather connection or vent 58 is provided. As shown, such vent 58 is formed in the stud 18 and is constituted by a longitudinal bore 60 which communicates adjacent its outer end with a plurality of lateral bores 62. The stud 18 is of sufficient length so that the lateral bores 62 will not be closed by the nut 17 when the actuator 2 is mounted in operative position. From this construction, it will be readily seen that the bores 60 and 62 form a labyrinth for the passage of air while effectively preventing the entrance of water and dirt into the actuator. It will be understood, of course, that the labyrinth vent construction may be formed separately from the stud 18, if desired.

A further feature of the invention includes the use of a novel seal construction which is associated with the push rod 24 and with the opening 26 in order to prevent the entrance of water, dirt and other foreign matter into the actuator during operation of the latter. As shown, Figs. 1, 4 and 5, such seal construction comprises a seal 64 which includes alternate discs of oil and wear resisting rubber composition 66 and 68 and felt 70 and 72, the latter being saturated with lubricant, and all of the discs being confined within a shell 74. Preferably, the discs 66, 68, 70 and 72 are assembled within the shell 74 along with a metal disc 76, as shown in Fig. 1, and the latter is punched inwardly at a plurality of points 80 around the periphery thereof in order to securely maintain the parts in position in the shell and to provide a unitary assembly. Also, the shell 74 is cut out to provide a plurality of laterally extending ears or lugs 82 which form a seat for one end of a spring 84, the opposite end of the spring seating against the plate 22 and thus serving to maintain the seal 64 in the position illustrated in Fig. 1. In addition to the foregoing, the shell 74 is formed to provide a short axial extension 86 for slidably receiving the push rod 24, it being pointed out that the metal disc 76 also has a sliding fit with respect to the push rod 24. In this manner, any side thrust of the push rod 24 is taken through the metal disc 76 and the extension 86, thus relieving side thrusts from the sealing discs 66, 68, 70 and 72 and increasing the wearing qualities of the latter.

As shown in Figs. 1 and 5, the shell 74 is also formed to provide an annular bead or projection 88 which bears against the end portion 90 of the plate 6 when the seal 64 is assembled in operative position. With such an arrangement, an annular line contact is obtained between the shell 74 and the casing end portion 90 which forms an effective seal for the chamber 14 and also minimizes the frictional drag between the shell and end portion during lateral movement of the push rod 24 and seal 64 with respect to the enlarged opening 26.

While Figs. 1, 2 and 3 illustrate the preferred manner of securing the plates 4 and 6 and the diaphragm 10 together to form the novel actuator of the invention, it will be understood that various modified constructions may be utilized which also avoid the use of a series of peripheral holes and the clamping bolts heretofore utilized. For example, in Fig. 6, the clamping ring 92 may be continuous, instead of split as in Fig. 1, and may be crimped over the marginal edges of the plates 4 and 6. In Fig. 7, the clamping ring 94 may also be continuous and formed to threadedly engage one of the plates 6. Figs. 8 and 9 illustrate further modifications of the use of a continuous clamping band 96 wherein a split locking ring 98 is utilized to lock the parts in assembled condition. Fig. 9 also illustrates a modified arrangement for clamping the bead 34 of the diaphragm 10 wherein the bead is directed axially instead of radially as in Fig. 1.

In Fig. 10, a modified type of push rod seal is illustrated and comprises an axially extending sleeve 100 which is secured to the end portion 90 and which is provided with an enlarged opening 102 through which the push rod 24 extends. A rubber boot 104 is tightly fitted on the rod 24 and when the actuator is in a released position, the outer edge 106 of the boot contacts the end portion 90 to seal the interior of the actuator. During operation of the actuator, the boot 104 will be carried with the rod 24 during movement of the latter and thus the arrangement performs the function of the breather or vent 58 of Fig. 1. Until the edge 106 contacts the end portion 90, air may pass freely through the opening 102. It will be noted, however, that during such passage of air, the direction of flow is axial through the sleeve 100 and then lateral or radial to the atmosphere. Hence the air passes through a labyrinth, as in the case of the vent 58, so that the construction of Fig. 10 functions to prevent excessive amounts of water or dirt from entering the actuator during operation thereof. It will be understood that the actuator is effectively sealed just as soon as the edge 106 again abuts the end portion 90. Thus, during the application period, a labyrinth passage for air is provided and during the release period, a tight seal is secured.

In operation of the form of the invention illustrated in Figs. 1, 2 and 3, it will be seen that after the seal 64 has been assembled and fitted on the push rod 24, it is only necessary to place the springs 30 and 84 between the plates 4 and 6 and clamp the latter and the annular diaphragm bead 34 together to obtain the actuator assembly 2 as shown in Fig. 1. With the actuator mounted on any suitable bracket, by means of the studs 16 and 18, the device may be charged with air pressure in order to move the diaphragm 10 and parts associated therewith to apply the vehicle brake or other part to be actuated. During application and release movement of the push rod 24 the seal 64 will be effective to prevent the entrance of water and dirt into the chamber 14, it being pointed out that the enlarged opening 26 enables lateral movement of the rod 24 to take place, while the annular line contact between the bead 88 of the shell 74 and the end portion 90 of the shell 6 minimizes the friction between these parts while insuring an effective seal. In addition to the above, the construction of the bores 60 and 62 of the breather 58 is such as to provide a labyrinth passage for air passing into and out of the actuator during movement of the diaphragm 10 in opposite directions, in order to further protect the actuator from dirt and water while insuring the free passage of air through the breather in opposite directions.

While several embodiments of the invention have been shown and described herein, it will be well understood by those skilled in the art that the invention is not limited to these but may be embodied in other forms without departing from the spirit of the invention. Reference will therefore be had to the appended claims for a definition of the limits of the invention.

What is claimed is:

1. A fluid pressure actuator comprising a pair of formed plates having marginal portions adapted to be connected together to form a housing, each of said marginal portions being formed with an outwardly extending circumferential shoulder, said shoulders being arranged in opposed relationship and having the outer surfaces thereof converging outwardly with respect to each other and having the inner surfaces thereof diverging outwardly with respect to each other, a flexible diaphragm within the housing having its marginal edge formed as a wedge-shaped bead provided with opposite circumferential surfaces which are respectively complementary with said inner surfaces of the shoulders and which are positioned between the latter, said diaphragm dividing the housing into a pressure chamber and an atmospheric chamber, connections for said chambers to respectively deliver fluid pressure to the pressure chamber and to connect the atmospheric chamber with the atmosphere, and means for clamping the shoulders of said plates and the bead of the diaphragm together, comprising a strap having opposite ends, each of which is provided with a pair of apertured lugs, said strap being channel-shaped in cross section to provide a pair of circumferential spaced-apart shoulders diverging inwardly with respect to each other and respectively engaging the outer converging surfaces of the shoulders of the plates and being respectively complementary to the latter, and means connecting complementary lugs to tighten said strap.

2. A fluid pressure actuator comprising a pair of dished plates having marginal portions adapted to be connected together to form a housing, each plate provided with a circumferential shoulder having inner and outer annular surfaces, said shoulders being arranged in opposed relationship and having said outer surfaces converging outwardly with respect to each other, a flexible diaphragm within the housing having its marginal edge formed as a wedge-shaped annular bead positioned between said inner surfaces of the shoulders, said diaphragm dividing the housing into a pressure chamber and an atmospheric chamber, connections for said chambers to respectively deliver fluid pressure to the pressure chamber and to connect the atmospheric chamber with the atmosphere, means for securely clamping the shoulders and bead together comprising a strap encircling said shoulders, said strap having a pair of circumferential, spaced-apart shoulders diverging inwardly with respect to each other and respectively engaging the outer surfaces of the shoulders of the plates, and means for tightening the strap to clamp the plates and diaphragm bead together through cooperation between said shoulders.

3. A fluid pressure actuator comprising a pair of dished plates having marginal portions adapted to be connected together to form a housing, each plate provided with an outwardly extending circumferential shoulder having inner and outer annular surfaces, said shoulders being arranged in opposed relationship and having said outer surfaces converging outwardly with respect to each other, the inner surfaces being substantially flat and diverging outwardly with respect to each other, a flexible diaphragm within the housing having its marginal edge formed as a wedge-shaped annular bead positioned between said inner surfaces of the shoulders, the opposite surfaces of said bead being substantially flat and complementary to said inner surfaces of the shoulders and diverging outwardly with respect to each other, said diaphragm dividing the housing into a pressure chamber and an atmospheric chamber, connections for said chambers to respectively deliver fluid pressure to the pressure chamber and to connect the atmospheric chamber with the atmosphere, means for securely clamping the shoulders and wedge-shaped bead together comprising a strap encircling said shoulders, said strap having a pair of circumferentially extending spaced-apart shoulders having opposed inner surfaces diverging inwardly with respect to each other and respectively engaging the outer converging surfaces of the shoulders of the plates, and means for tightening the strap to clamp the plates and wedge-shaped bead together through cooperation between said shoulders.

4. A fluid pressure actuator comprising a pair of dished plates having marginal portions adapted to be connected together to form a housing, each plate provided with a circumferential shoulder having inner and outer annular surfaces, said shoulders being arranged in opposed relationship and having said outer surfaces converging outwardly with respect to each other, a flexible diaphragm within the housing having its marginal edge thickened in a radially outward direction to provide an annular bead which is wedge-shaped in cross-section, the opposite surfaces of said bead being complementary to and engaging said inner surfaces of the shoulders, said diaphragm dividing the housing into a pair of pressure chambers, means for securely clamping the shoulders and bead together comprising strap means encircling said shoulders, said strap means having a pair of circumferential, spaced-apart, inwardly directed shoulders diverging inwardly with respect to each other and respectively engaging the outer surfaces of the shoulders of the plates, and means for tightening the strap means to clamp the plates and diaphragm bead together through cooperation between said shoulders.

References Cited in the file of this patent

UNITED STATES PATENTS

| | | |
|---|---|---|
| 2,076,715 | Fretter | Apr. 13, 1937 |
| 2,270,259 | Burke | Jan. 20, 1942 |
| 2,383,241 | Down | Aug. 21, 1945 |
| 2,429,782 | Versoy | Oct. 28, 1947 |
| 2,437,552 | Quiroz | Mar. 9, 1948 |
| 2,465,714 | Elliott | Mar. 29, 1949 |
| 2,467,517 | Almond | Apr. 19, 1949 |
| 2,491,306 | Feitl | Dec. 13, 1949 |
| 2,495,369 | Elliott | Jan. 24, 1950 |
| 2,509,143 | Getchell | May 23, 1950 |
| 2,544,631 | Heimann et al. | Mar. 6, 1951 |
| 2,545,857 | Perkins et al. | Mar. 20, 1951 |
| 2,551,489 | Eichmann | May 1, 1951 |
| 2,574,700 | Knauss | Nov. 13, 1951 |
| 2,574,574 | Ives | Nov. 13, 1951 |
| 2,602,593 | Raney | July 8, 1952 |
| 2,653,836 | Christophersen | Sept. 29, 1953 |